United States Patent [19]

Hickey

[11] 4,114,668

[45] Sep. 19, 1978

[54] CONTAINERS HAVING FLUID-TIGHT SEALING MEANS

[76] Inventor: Christopher Daniel Dowling Hickey, 5 Heathside, Hinchley Wood, Esher, Surrey, England

[21] Appl. No.: 746,614

[22] Filed: Dec. 1, 1976

[30] Foreign Application Priority Data

Dec. 4, 1975 [GB] United Kingdom ............... 49890/75
Jun. 2, 1976 [GB] United Kingdom ............... 22758/76

[51] Int. Cl.[2] .............................................. B65D 51/16
[52] U.S. Cl. .................................. 150/0.5; 150/52 R; 220/378
[58] Field of Search ................... 150/0.5, 52; 220/378, 220/DIG. 3; 206/522

[56] References Cited

U.S. PATENT DOCUMENTS

| | | | |
|---|---|---|---|
| 2,419,322 | 4/1947 | Matheny | 220/DIG. 3 |
| 3,006,396 | 10/1961 | Cushman | 206/522 |
| 3,159,884 | 12/1964 | Hankey | 206/522 |
| 3,159,886 | 12/1964 | Lynch | 220/DIG. 3 |
| 3,161,925 | 12/1964 | Bertolini | 220/378 |
| 3,670,880 | 6/1972 | Burleson | 229/DIG. 12 |
| 3,783,766 | 1/1974 | Boucher | 150/52 R |
| 3,850,214 | 11/1974 | Hickey | 150/0.5 |

*Primary Examiner*—Ro E. Hart
*Attorney, Agent, or Firm*—Young & Thompson

[57] ABSTRACT

In a container of the kind having an impermeable base and a flexible cover which is sealed into a groove or slot in the base to form an airtight package, the cover has, around its periphery, an endless male member for engaging in the slot or groove, e.g. an endless inflatable tube, which is resiliently gripped in the slot or groove.

5 Claims, 11 Drawing Figures

41 36 37 38 39 30 40 33 35 32 31

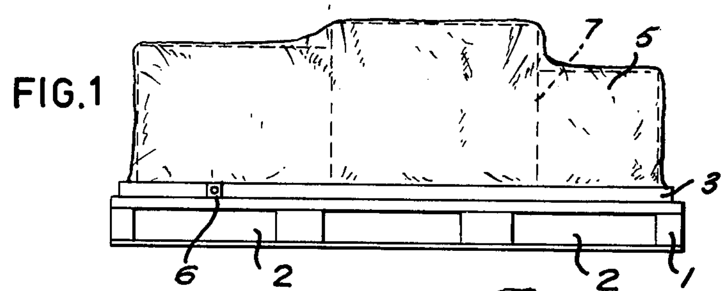
FIG.1
7
5
3
6
2
2
1
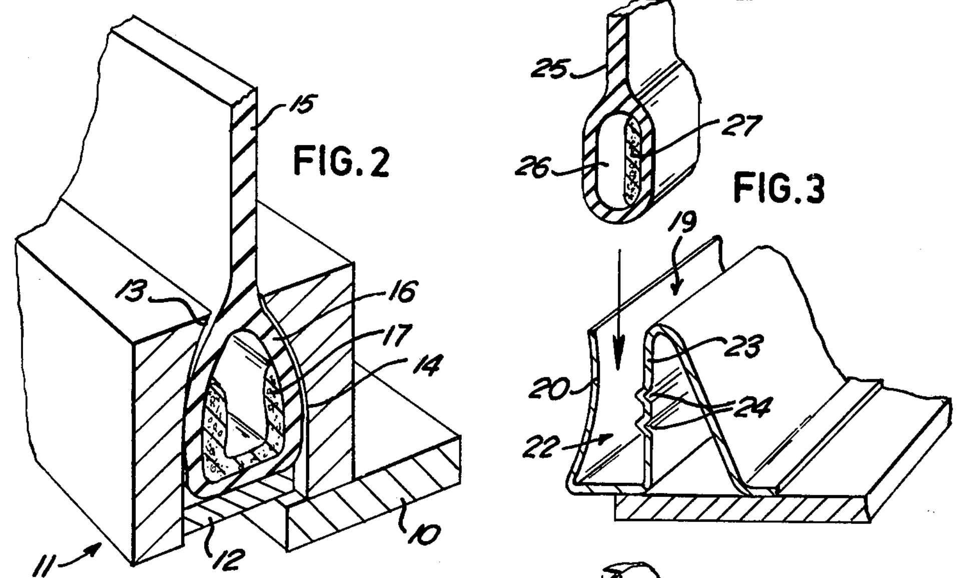
FIG.2
15
13
16
17
14
11
12
10
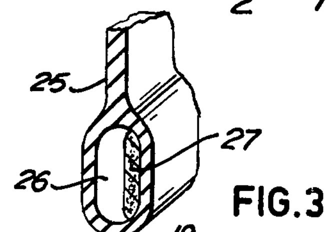
25
27
26
FIG.3
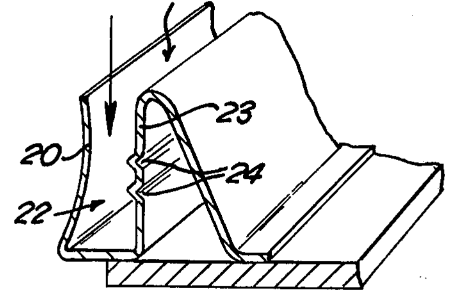
19
23
20
24
22
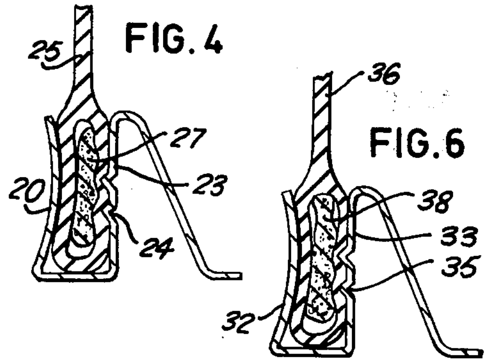
FIG.4
25
27
23
20
24
36
FIG.6
38
33
35
32
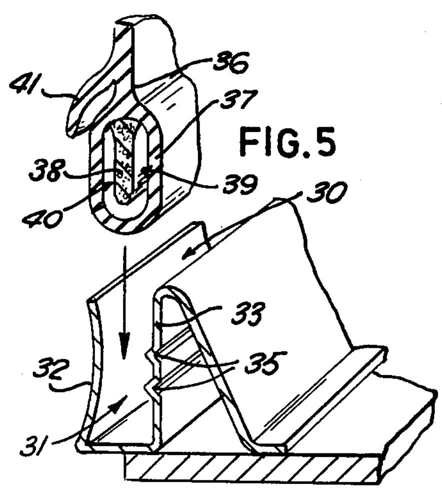
41
36
37
FIG.5
38
39
40
30
33
32
35
31

60
56
59
58
58
57
55
55
53
54
54
52
51
50
68
66
65
65
64
61
62
63
75
76
77
77
78

CONTAINERS HAVING FLUID-TIGHT SEALING MEANS

BACKGROUND OF THE INVENTION

1. Field of the Invention

This invention relates to containers having a fluid-tight sealing means for sealing a flexible cover sheet of impermeable material to an impermeable base or other structure formed at least partly of rigid or semi-rigid material and which may be evacuated or pressurised to protect goods on said base.

2. Prior Art

Containers of this type are known, for example, from British Patent No. 1,191,921 and U.S. Pat. Nos. 3,850,214, 3,815,650 and 3,929,178. It is known, see, for example, U.S. Pat. No. 3,850,214, to effect a seal between a flexible envelope and a base of rigid or semi-rigid material by making use of a flexible inflatable tube along the periphery of the sheet material which tube is inserted into a slot or groove in the rigid or semi-rigid material and then inflated into pressure engagement with the walls of the slot or groove. Such a sealing means finds particular application for containers where the base is formed of impermeable material and either air is evacuated from the container so that the flexible sheet collapses downwardly onto goods to hold them firmly on the base or in which a gas, for example dry air, is put into the envelope. The inflatable tube along the periphery of the sheet can be inserted into a groove or slot extending continuously around the base to effect a fluid-tight seal between the flexible sheet material and the base.

When such a container is used for long term storage, it is possible that there may be loss of fluid pressure in the inflated tube so that the tube is pulled out or partly pulled out of the slot or groove. This problem can arise particularly if the container is transportable as stresses may be applied to the cover when the container is moved. For this reason, it has been proposed in the aforementioned U.S. Pat. No. 3,850,214 to provide auxiliary securing means comprising a flap on the cover sheet which is mechanically secured by eyelets engaging hooks on the base of the container. Such a construction prevents the tube being pulled out of the groove or slot but does not necessarily ensure that the seal between the cover sheet and the base remains airtight if pressure is lost in the inflated tube.

SUMMARY OF THE INVENTION

It is an object of the present invention to provide an improved means for sealing the cover of the container to the base in which the use of two separate securing means is obviated.

According to this invention, a container comprises a flexible cover sheet of impermeable material and an impermeable base, the base having a load-carrying surface with an endless groove extending around that surface or at least around a major part thereof, said groove comprising two spaced upright wall members sealed to or integral with the base, and the cover having, around its periphery or attached to its periphery, an endless male member for inserting into said groove, said male member being formed at least partly of elastomeric material and shaped to be a force fit into said groove between said upright walls or between linings on said walls so as to form an airtight seal between the cover and the base and wherein valve means are provided in the base or the cover to permit the interior of the container to be pressurised or evacuated of air.

With this construction, the male member is forced into the endless groove or slot and is resiliently retained therein by the resilience of the elastomeric material of that member and/or by the resilience of the lining if a lining is provided in the slot or groove.

In one convenient form of construction, the male member comprises an endless tube with resilient means arranged to urge at least one wall of the tube outwardly against a wall of the slot or groove. The tube may be inflatable so that the cover sheet can be firmly secured and sealed to the base by inflating the tube. The resilience of the male member then provides a safeguard against the tube accidentally being pulled from the slot or groove if this tube is deflated.

In such a construction, conveniently the slot or groove is formed with rigid walls having ribs, flanges or other inwardly extending projections engaging the tube. For example, the slot or groove may have a mouth which is narrower than the part of the slot or groove inwardly of the mouth whereby the tube when inflated cannot be withdrawn through the mouth. Conveniently however the slot or groove has a longitudinal rib or ribs to grip the tube when the latter is inflated. In one construction, the slot or groove has a waist portion with one or more ribs extending longitudinally along one or both sides of this waist portion.

The aforementioned resilient means conveniently comprises a sponge elastomer, e.g. a sponge rubber. Such material might be put on the outside of the tube but preferably is inside the tube. If it is inside the tube, the sponge elastomer may form a lining not completely filling the cross-section of the tube so leaving a free passage for inflation of the tube. Conveniently the sponge elastomer is in the form of a strip inside the tube and attached to the tube wall along a narrower edge of the strip; the air space in this case is between the tube wall and the remaining surfaces of the strip. In these constructions, when the tube is inflated, the sponge elastomer is compressed by the fluid pressure and the tube is firmly retained in the slot or groove. However the sponge elastomer might completely fill the tube provided the cells in the sponge are interconnected to permit passage of air or other fluid along the tube so that the tube can be inflated.

The invention furthermore includes within its scope a container comprising a flexible sheet of impermeable material having a flexible inflatable tube around its periphery and a rigid or semi-rigid impermeable base member having an endless slot or groove to receive said tube, the slot or groove being shaped to hold the tube when the latter is inflated, whereby the tube may be retained in the slot or groove after insertion therein by inflation of the tube, wherein the tube is provided with resilient means deformable to permit the tube being passed into the slot or groove, said resilient means urging the walls of the tube apart to engage the side walls of the slot or groove whereby the tube, when inflated, has to be deformed to force it into or out of the slot or groove, so ensuring a seal between the base and the cover, said container furthermore having valve means in the base or cover to permit the interior of the container to be pressurised or evacuated of air.

The male member need not be an inflatable tube; it may be a solid member which is a force fit in the slot or groove. In this case, preferably said endless male member is formed of elastomeric material shaped with ridges or projections on at least one of the surfaces facing a wall of the slot or groove. Preferably also with such a construction, the walls of said slot or groove are lined with a resilient material which is softer than the material of the male member.

In one form of construction, the male member has ribs or projections extending longitudinally along one or both of its side faces. Such ribs or projections might be formed as rounded beads or pointed or cusp-shaped projections. In one convenient form of construction the projections are wedge-shaped projections, the wedge shapes being such as to facilitate entry of the male member into the groove but having shoulders which resist withdrawal of the male member from the groove engaging into the soft lining of the groove.

Preferably the male member is shaped to have a rib or ribs or other projection which extends outwardly from the outer wall of the envelope beyond the outer edge of the outer wall of the groove when the male member is inserted in the groove. Such a rib or other projection facilitates manual gripping of the male member to force it into the groove when sealing the container and to remove it therefrom when unsealing the container.

The male member conveniently is formed of a relatively hard plastics material. This member may be formed integrally with the cover or may be secured thereto, e.g. by welding or by an adhesive or it may be separate from the cover; in the last-mentioned case, the peripheral portion of the cover is put into the groove and the male member then forced into the groove to wedge the cover therein.

The aforementioned lining of the groove is preferably of a soft resilient material for example rubber, which is softer than the male member. This lining material may have outwardly-turned portions or enlarged ends extending over the tops of the side walls of the groove.

The invention further includes within its scope a container comprising an impermeable base and a flexible impermeable cover, the base having a load-carrying surface with a continuous groove extending around that surface or at least the major part thereof, said groove comprising two spaced upright wall members sealed to or integral with the base and the cover having around its periphery or attached to its periphery an endless male member for inserting into said groove, which male member is formed of elastomeric material and shaped to be a force fit into said groove between said upright walls or between linings on said walls, to seal the cover to the base, valve means being provided in the base or cover to permit the interior of the container to be pressurised or evacuated of air. Preferably the walls of the groove, on their inwardly-facing surfaces, are lined with a resilient material which is softer than the material of said male member.

The aforementioned base is conveniently formed of metal but may be made of other materials. Preferably it is formed as a pallet. Such a pallet may be shaped in the known way for admission of the forks of a fork-lift truck underneath the impermeable base to enable the container to be lifted. The groove may be formed around the peripheral edge of the pallet or may be spaced, over the whole or part of its length, inwardly from the peripheral of the base. This latter arrangement facilitates for example the fitting of posts on the base for the supporting on one pallet on top of another.

BRIEF DESCRIPTION OF THE DRAWINGS

FIG. 1 is a diagram showing, in elevation, a container of the type to which the present invention can be applied;

FIG. 2 is a sectional perspective view of part of a sealing means for a container and illustrating one embodiment of the invention;

FIG. 3 is a diagrammatic exploded sectional perspective view of part of another construction of sealing means;

FIG. 4 shows the sealing means of FIG. 3 assembled together to make a seal;

FIG. 5 and 6 are views similar to FIGS. 3 and 4 of yet a further construction of sealing means;

DESCRIPTION OF THE PREFERRED EMBODIMENTS

Figures 7, 8, 9, 10, 11:
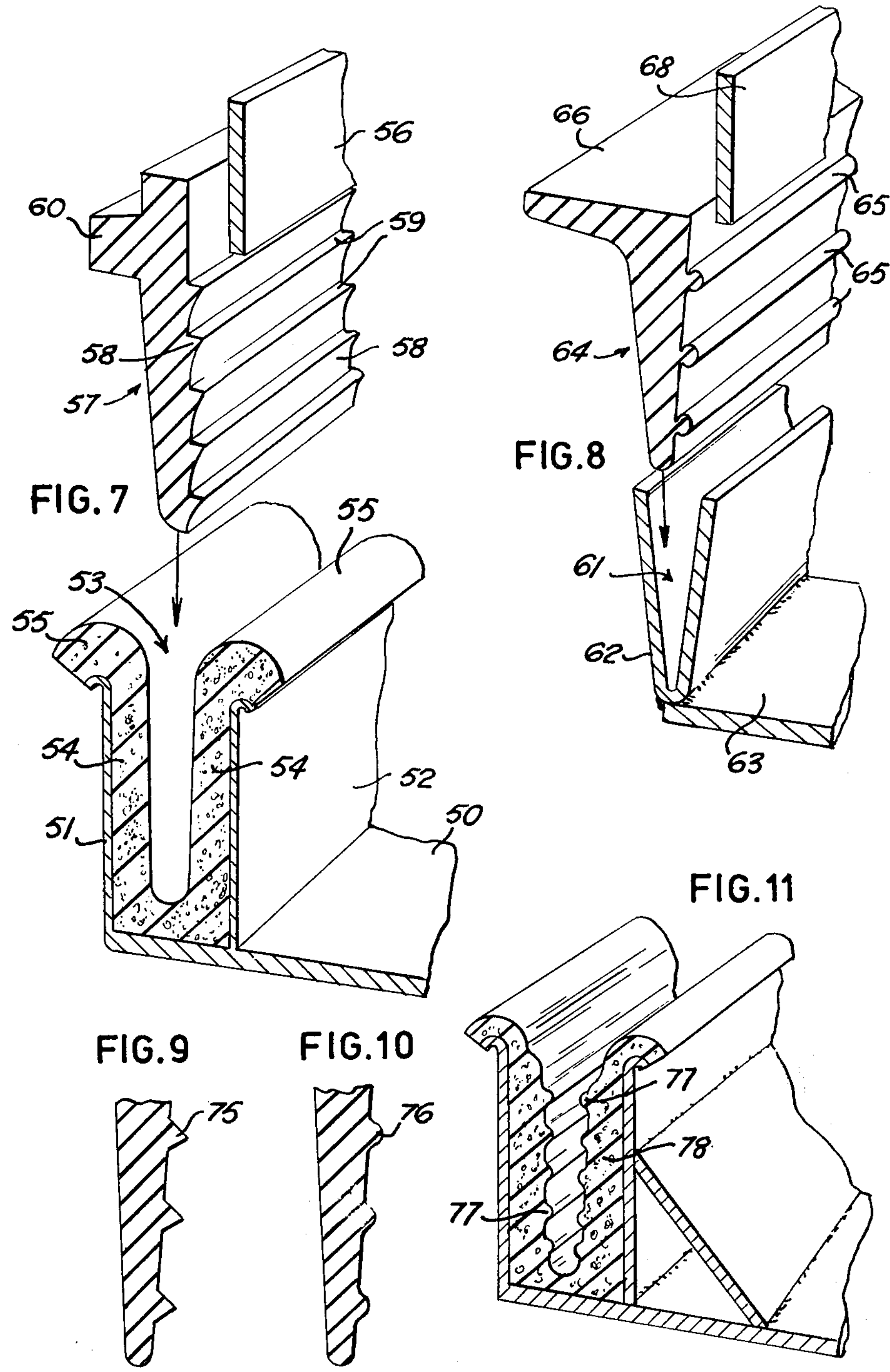
FIG. 7 is an exploded perspective view of part of a base and cover (in section) for forming another construction of container.
FIG. 8 is a view similar to FIG. 7 of another embodiment of the invention.
FIGS. 9 and 10 illustrate further forms of ribs on the male member.
FIG. 11 illustrates the provision of ribs on a lining of a groove in another construction.

Referring to FIG. 1, there is shown diagrammatically a container for goods comprising a rigid impermeable base 1 constructed as a pallet with openings 2 for the forks of a fork-lift truck. Near the periphery of the base is an upstanding member 3 forming an endless groove (not shown) in which is secured the periphery of a flexible impermeable cover sheet 5, which is typically formed of butyl rubber. Valve means 6 are provided in the base 1, or alternatively in the cover 5 enabling air to be partially evacuated from within the container so that the cover sheet is drawn down onto goods 7 within the container. Only a small reduction in air pressure is necessary to ensure that the cover is pressed, by the outside atmospheric pressure, into tight engagement with goods on the base. The goods are thus firmly held on the base. The valve means may alternatively or additionally be arranged for pressurising the container, e.g. with dry air or with an inert gas as may be desired in some cases for storing goods.

The present invention is concerned more particularly with the manner of sealing the cover 5 to the base 1 and FIG. 2 illustrates one construction for this sealing means.

Referring to FIG. 2 of the drawing, there is shown a rigid impermeable base plate 10 which may constitute the top surface of pallet 1. Attached to this base plate around the periphery thereof is a member 11 of rigid or semi-rigid material, for example plastics material, having a slot therein which is open at the bottom except for narrow crossties as indicated at 12. The mouth of the slot as shown at 13 is narrower than the part 14 of the slot inwardly of the mouth. The edge of a flexible cover sheet 15 around its whole periphery has an integral tube 16 which can be passed through the mouth 13 of the slot and then inflated into pressure-sealing engagement with the walls of the slot by means of an inlet valve not shown. Within the tube 16 is a resilient lining 17 of sponge elastomeric material, e.g. sponge rubber, which normally pushes the sides of the tube outwardly so that, even if the tube is not inflated, it engages the walls of the slot. This resilient lining 17 extends along the whole length of the tube. On inflation of the tube, the sponge material is compressed and the tube is firmly held by the slot.

In FIGS. 3 and 4 another construction is shown, FIG. 3 illustrating the periphery of the cover and the groove in the base before they have been put together and FIG. 4 showing the two parts of FIG. 3 in the assembled position. Referring to FIGS. 3 and 4, there is shown a groove 19 formed of sheet metal, one side wall 20 of groove 19 being curved, in transverse section, to form a waist 22 in the groove 19. The other side wall 23 is substantially straight but has two longitudinal ribs 24 in the waist 22 of the groove. The sheet 25 of flexible plastics material to be secured in position has an integral tube 26 along its periphery, one side of the tube being filled with sponge elastomer 27. As seen in FIG. 4, the tube has to be squeezed to deform the sponge material 27 so as to permit insertion in the groove. It is thus retained therein resiliently even without inflation. Inflation of the tube ensures a firm grip, the air pressure compressing the elastomer.

FIGS. 5 and 6 are views similar to FIGS. 3 and 4 but showing a modified construction. These figures show a construction in which an upstanding groove or channel 30 having a waist portion 31 is formed by two side walls 32, 33. The wall 33 may have longitudinal ribs as shown at 35. A sheet 36 of flexible plastics material has an integral tube 37 along its periphery for insertion in the groove. The tube 37 is of elongate internal form in cross-section and has a strip 38 of sponge elastomer attached by one of its narrower edges to one of the narrower internal faces of the tube so leaving air spaces 39, 40 between the two broader faces of the strip and the tube wall. The tube is inserted in the groove 30 and is resiliently retained therein by the elastomer strip 38. Inflation of the tube ensures that it is firmly held in position. FIGS. 5 and 6 also illustrate the provision of an integral flap 41 on the sheet 36 which fits over one side wall of the groove or channel 30 forming a lip to improve the sealing.

Referring to FIG. 7, there is shown part of a metal tray having an impermeable base 50 with two upright walls 51, 52 which define an endless groove 53 around the periphery of the base. The tray is conveniently constructed as a pallet, for example, with transverse members on its underside to enable the forks of a fork-lift truck to be inserted under the base 50 when the tray is resting on the ground. In the embodiment of FIG. 7, the groove is lined on both sides with soft rubber 54, this soft rubber extending over the top edges of the walls 11, 12 as shown at 55.

For storing goods on the tray, a flexible cover, part of which is shown at 56, which is formed of impermeable material is put over the goods and an endless male member 57, secured on the periphery of the cover and extending around the periphery thereof is forced into the groove 53 between the linings 54. The male member 57, in cross-section is tapered so that the thickness decreases towards its lower edge. In the embodiment illustrated, one face is formed with a series of wedge-shaped ribs 58 extending along the length of the male member, each rib having an upper shoulder 59 which engages in the soft rubber lining 54 to ensure that the male member 57 is held firmly in the groove. This male member 57 is formed of a resilient plastics material, preferably a harder material than the lining 54 and has an integral outwardly directed flange 60 which, when the member 57 is forced into the groove 53, extends outwardly over the top of the lining material 55 above the top of the outer wall 51. The flange 60 facilitates manual forcing of the male member into the groove when the container is to be sealed and withdrawal therefrom when the container is to be unsealed. The lower end of the male member engages the soft lining material at the bottom of the groove 53, the flange 60 engages the top of the lining and the side faces of the male member engage the inwardly-facing surfaces of the lining to give an airtight seal.

When the male member 57 has been inserted into the groove 53, air is partially evacuated from the region within the cover 55 through a valve (not shown) in the cover or, preferably, in the base. The vacuum holds the cover down onto any goods on the base so securing such goods firmly, as may be necessary for transport purposes.

FIG. 8 shows another construction in which the endless groove, shown at 61, is formed of a metal or ceramic member 62 with a smooth finish and secured around the periphery of a pallet 63. The male member, shown at 64 with longitudinally-extending ribs 65 and an outwardly-directed flange 66, is forced into the groove 60 to be gripped by compression of the resilient material. A cover of flexible impermeable material 68 is welded or otherwise secured to the male member 64 to form, with the pallet 63, a container which can be partially evacuated as described above.

FIGS. 9 and 10 illustrate at 75 and 76 respectively, alternative rib shapes for use on the male member. As shown at 77 in FIG. 11, the lining 78 of a groove may also be provided with longitudinally-extending ribs. Other rib shapes may be used on the lining, for example ribs of the shape shown in FIGS. 9 and 10.

I claim:

1. A container comprising a flexible sheet of impermeable material having a flexible inflatable tube around its periphery and a rigid or semi-rigid impermeable base member having an endless slot or groove to receive said tube, the slot or groove being shaped to hold the tube when the latter is inflated, whereby the tube may be retained in the slot or groove after insertion therein by inflation of the tube wherein the tube is provided with resilient means inside the tube and extending along the whole length of the tube and deformable to permit the tube being passed into the slot or groove, said resilient means urging the walls of the tube apart to engage the side walls of the slot or groove, the resilient means being of sponge material secured to the inside surface of the tube over a limited part of the cross-sectional periphery of the tube to leave a region between the resilient means and the inside surface of the tube forming a duct extending continuously along the length of the tube for inflation of the tube, whereby the tube, when uninflated, has to be deformed to force it into or out of the slot or groove, so ensuring a seal between the base and the cover, said container furthermore having valve means to permit the interior of the container to be pressurized or evacuated of air.

2. A container as claimed in claim 1 wherein the slot or groove is formed with rigid walls having ribs, flanges or other inwardly-extending projections engaging the tube.

3. A container as claimed in claim 1 wherein said resilient means comprises a strip of sponge elastomer having narrow and broad faces in cross-section and attached to the tube wall along one narrow face only.

4. A container as claimed in claim 1 wherein the resilient means comprises a strip of sponge elastomer within the tube and attached to the tube wall, the strip extending along the length of the tube.

5. A container as claimed in claim 4 wherein said strip has, in cross-section, two narrow and two broad faces and is secured over one of its broad faces to the inside surface of the tube to extend around part of the cross-sectional periphery thereof.

* * * * *